Patented Apr. 8, 1924.

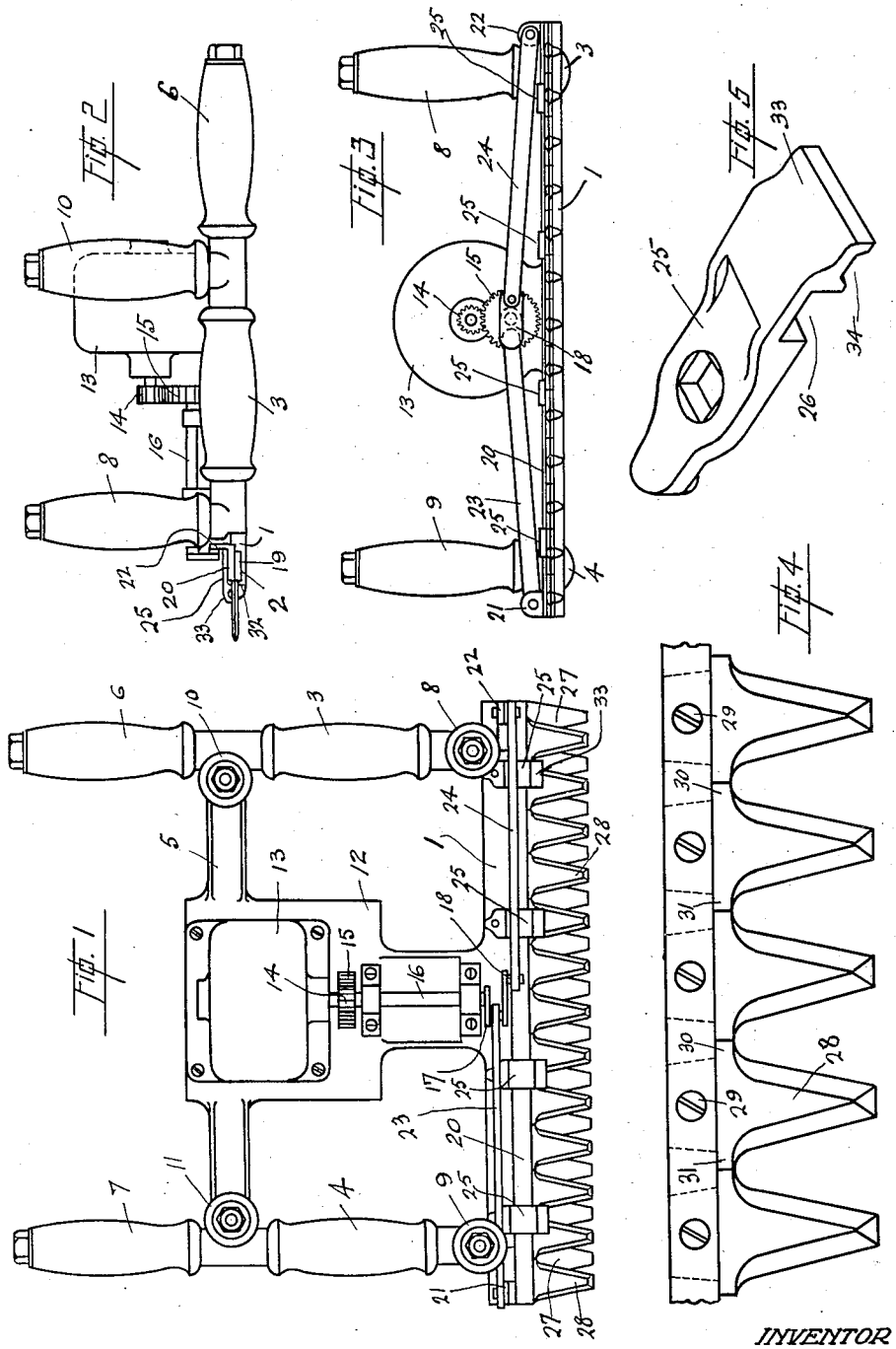

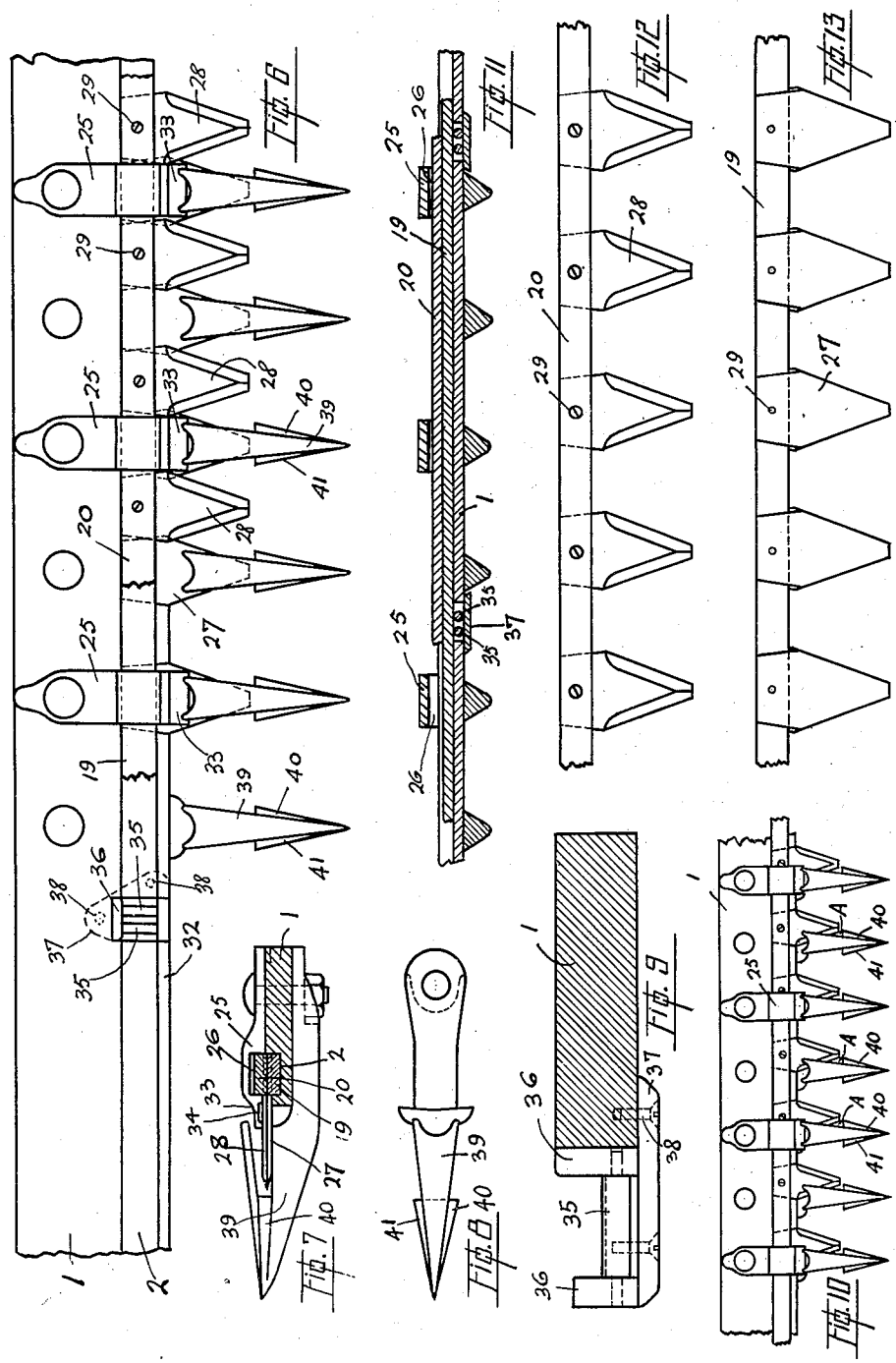

1,489,658

UNITED STATES PATENT OFFICE.

PHILIP ALEXANDER CAMPBELL, OF VANCOUVER, BRITISH COLUMBIA, CANADA.

CUTTER.

Application filed April 15, 1922. Serial No. 553,087.

*To all whom it may concern:*

Be it known that I, PHILIP ALEXANDER CAMPBELL, a subject of the King of Great Britain, residing at the city of Vancouver, in the Province of British Columbia, Canada, have invented certain new and useful Improvements in Cutters, of which the following is a specification.

My invention relates to improvements in cutters, with more particular reference to a cutter adapted for use as a hedger, or grass cutter, or for use in mowing machines or machines of an analogous character, and the object of my invention is to provide a cutter having double-knifed bars operating laterally in shear-like fashion capable of being assembled and maintained in close contact while at the same time the construction is kept low and flat so that the twigs, grass, hay, or whatever crop is being cut falls back readily behind the cutter and is not carried along thereby as may happen where the construction stands high above the knives. Further objects are to provide means whereby the knifed bars operate with the minimum of friction, means for preventing the bars from spreading and separating, means whereby the knives are aligned with ease and accuracy, and means for directing the hay or other product between the knives when the cutter is used in a mower or like machine.

I attain these objects by the construction illustrated in the accompanying drawings in which—

Fig. 1 is a plan view of the cutter embodied in a hedger.

Fig. 2 is a side view of Fig. 1.

Fig. 3 is a front view of Fig. 1.

Fig. 4 is a fragmentary plan view of a hedger knifed bar.

Fig. 5 is a perspective detail view of a bridge bracket.

Fig. 6 is a fragmentary plan view of the cutter arranged for embodiment in a mower.

Fig. 7 is an end view of Fig. 6, the grooved plate and knifed bars being shown in section.

Fig. 8 is a detail plan view of a finger.

Fig. 9 is a view in part section showing the friction rollers.

Fig. 10 is a plan view illustrating the function of the fingers to direct the products to be cut between the knives.

Fig. 11 is a longitudinal sectional view showing the co-operation of the knifed bars and the rollers.

Fig. 12 is a fragmentary plan view of the upper knifed bar.

Fig. 13 is a fragmentary plan view of the lower knifed bar.

Similar numerals of reference indicate similar parts throughout the several views.

Referring now to Figs. 1, 2 and 3 illustrating a machine for trimming hedges and embodying my invention, although it should be understood that it may be embodied with equal facility and equivalency in other machines of an analogous character, 1 indicates a plate provided with a groove 2 extending from end to end of the plate. This plate, being intended to be carried by the operator, is provided with horizontally disposed gripping handles 3 and 4 connected to the plate adjacent its opposite ends and these handles are connected at their outer ends by a cross bar 5 while beyond this bar is provided another pair of gripping handles 6 and 7 in alignment with handles 3 and 4. Thus the operator may grip the device close up to the plate 1 or as far from it as the outer handles will permit, as desired. Two pairs of vertical handles, 8—9, and 10—11 are also provided, one pair 8 and 9 being close to the plate 1 and the other pair 10 and 11 being erected at the opposite ends of the cross connecting bar 5, from which it will be seen that the handling and manipulation of the machine is rendered as convenient as possible. The plate 1 and the connecting bar 5 are connected by a centrally located plate 12 which provides a platform on which a small electric motor 13 is mounted, to the shaft of which motor is secured a small gear 14, which gear meshes with a larger gear 15 secured to the end of a shaft 16 rotatably mounted on the plate 12 the inner end of which shaft extends above the plate 1 and is provided with a pair of diametrically opposed cranks 17 and 18.

Seated in the groove 2 is a bar 19 the same length as the groove and slidable therein and mounted on the bar 19 is a bar 20 of similar length, each of these bars being provided at one end with an upstanding apertured lug 21 and 22 respectively. Extending between the lugs and the cranks 17 and 18 are connecting rods 23 and 24, from which it will be apparent that rotation of the cranks causes simultaneous lateral reciprocation of the bars 19 and 20 in opposite directions. The upper bar 20 is maintained in slidable contact with the lower bar 19 by means of brackets 25 secured to the plate 1 at spaced intervals, each bracket being provided with a slot 26 through which the bar slides when in operation, as shown particularly in Fig. 4.

Secured to the upper face of the bar 19 and the lower face of the bar 20 are the lower and upper cutting knives 27 and 28 respectively, which knives are substantially triangular in shape and have their opposite converging edges sharpened. Each knife is dovetailed into its respective bar, as indicated in Fig. 4 and also Figs. 12 and 13, so as to be flush with the bar and is secured in place by means of a screw 29, as shown in Figs. 4, 12, and 13, and the knives are provided at the root with side lugs 30 and 31, as in Fig. 4, or are spaced apart, as in Figs. 12 and 13, so that the opposed edges of adjacent knives are spaced apart at the ends nearest the bar 19 and 20 respectively. The lower knives 27 lie close to the upper edge of the outer wall 32 of the groove 2 while the upper knives 28 are maintained in close cutting contact with the lower ones by means of the bridge brackets 25, as shown in Fig. 7, each of which is provided with an extension, indicated by the numeral 33, which projects over the knives, and in order to eliminate undue friction between the upper knives and the extensions the lower surface of each of these is cut away as at 34 in Fig. 5.

The lower bar 19 rests on rollers 35 fitted in the groove 2 and each set of rollers, which may be in pairs, as shown, is carried by a pocket 36 so as to be removable if required and the pocket is provided with a flange 37 whereby it may be detachably secured in place, or in other words, at each roller station the plate 1 is cut away to provide an opening large enough to admit the pocket, which is inserted therein with the flange 37 abutting against the underside of the plate and is then secured by screws 38 passed through the flange into the plate 1, as shown in Figs. 6 and 9.

The operation of the device will be readily understood as it will be seen that rotation of the motor 13, when connected to a suitable circuit, will rotate the shaft 16 and the cranks 17 and 18 and actuate the connecting rods 23 and 24 so that the upper and lower sets of knives are moved in opposite directions in accordance with the speed of the cranks to cut and trim the hedge or lawn with great facility and convenience in shear-like fashion closely, evenly, and cleanly, since they are maintained in close cutting contact and held against spreading and separating by the bridge brackets 25. It will also be noted that the insertion of the rollers 35 in the groove 2 enables the operation of the knifed bars to be effected smoothly and with the minimum of friction, while the dovetailing of the bars to receive the knives ensures perfect alignment of the latter when assembling or replacing knives, since the seating of the knife in its respective dovetailed seat ensures that it will be in correct alignment with the other knives without other adjustment.

When the cutter is embodied in a mowing machine the knifed bars may be connected to and operated by pitmen in the well-known manner, as will be readily understood without further explanation by those skilled in the art, and in this case it is desirable to provide the plate 1 with a row of fingers or guards 39 projecting beyond and in front of the knives to separate the hay or other crop during cutting and also to protect the knives against stones or other objects. These fingers are somewhat similar to the fingers found in mowers in use at the present time with the exception that they have the usual knife supporting surface left off so that the sides of the fingers are smooth and thus no grass or hay can stick to the finger. At their outer ends, however, the fingers are provided on each side with side wings 40 and 41 extending from the point rearwardly and tapering outwardly so that when viewed in plan the pointed end of the finger has the appearance of an arrow head, the object of this formation being to direct the hay in between the knives and prevent it as far as possible from entering between the knife and the finger, that is, entering the space marked A in Fig. 10, reference to which view will show that the wings of the fingers obstruct the opening A and deflect the hay or other crop into the knives so that choking of the knives is thereby prevented.

What I claim as my invention is:

1. A cutter including a plate provided with a longitudinal groove of substantially the same length as the plate, said plate also having portions cut out of it at spaced points and intersecting said groove, pockets adapted to be inserted in place of the cut-out portions, each pocket being provided with rollers projecting slightly above the bottom of the groove, a pair of superposed knifed bars reciprocable in opposite directions, one of said bars being disposed in said groove with the lower bar mounted on the rollers, and spaced brackets secured to said plate, bridging said bars and each having a slot through which the upper bar is slidably operable.

2. A cutter including a plate having a longitudinal groove of substantially the same length as the plate a pair of superposed knife bars, the lower one of which is disposed in said groove, in opposite directions, roller bearings fitted in said groove on which the lower bar is mounted, and spaced brackets secured to said plate, bridging said bars and each having an inverted groove through which the upper bar is slidably operable, said brackets being extended at their outer ends to bear on the knives of the upper bar.

3. A cutter comprising a handled plate having a longitudinal groove and provided with a rearwardly extending platform, a motor mounted on said platform, a two throw crank shaft operated by said motor, a pair of superposed knifed bars, the lower one of which is disposed slidably in said groove and each having a lug at one end, and connecting rods extending respectively between said lugs and the cranks of said shaft.

4. A cutter comprising a handled plate having a longitudinal groove and provided with a platform extending between the handles, a motor mounted on said platform, a two throw crank shaft operated by said motor, a pair of superposed knifed bars, the lower one of which is disposed slidably in said groove and each having a lug at one end, connecting rods extending respectively between the lugs and the cranks of said shaft, roller bearings in the plate groove on which the lower knifed bar is mounted, and spaced brackets secured to the plate, bridging said bars and each having a slot through which the upper bar is slidably operable.

5. A cutter comprising a handled plate having a longitudinal groove and provided with a platform extending between the handles, a motor mounted on said platform, a two throw crank shaft operated by said motor, a pair of superposed knifed bars, the lower one of which is disposed slidably in said groove, and each having a lug at one end, connecting rods extending respectively between the lugs and the cranks of said shaft, roller bearings in the plate groove on which the lower knifed bar is mounted, and spaced brackets secured to the plate, bridging said bars and each having a slot through which the upper bar is slidably operable, said brackets being extended to bear on the knives of the upper bar.

6. A cutter comprising a plate having a longitudinal groove of substantially the same length as the plate, a pair of superposed bars, the lower one of which is disposed in said groove, means for reciprocating said bars in opposite directions, forwardly extending knives carried by said bars and having tapered side cutting edges, and fingers secured to said plate extending under the knives of the lower bar and beyond the same and having a rearwardly extending portion overlapping the knives of the upper bar, said fingers being provided with sides wings tapering outwardly from the finger end into close proximity to the points of said knives.

7. A cutter comprising a plate having a longitudinal groove of substantially the same length as the plate, a pair of superposed knife bars, the lower one of which is disposed in said groove, means for reciprocating said bars in opposite directions, rollers in said groove on which the lower bar is mounted, spaced brackets secured to the plate, bridging said bars and each having a slot through which the upper bar is slidably operable, said brackets being extended to bear on the knives of the upper bar, the extended portions of said brackets being provided with inverted grooves spaced from the front edges of the extended portions to provide narrow bearing surfaces on the extended portions of the brackets, and fingers secured to the plate extending under the knives of the lower bar and beyond the same having a rearwardly extending portion overlapping the knives of the upper bar and also the extended ends of the brackets, said fingers being provided with side wings tapering outwardly from the finger end into close proximity to the points of the said knives.

8. A cutter including a supporting plate, horizontally disposed handle bars extending rearwardly from said plate and each bar provided with a plurality of horizontally disposed handles, a cross bar having its ends connected to intermediate portions of the handle bars, vertically disposed handles arranged at the ends of the cross bar and at the forward ends of the handle bars, a platform extending between said cross bar and said plate, a prime mover mounted on said platform, a plurality of knife bars mounted in superposed relation on said plate and each having forwardly extending blades provided with tapered side cutting edges, and transmission means connecting said prime mover with said knife bars for reciprocating the knife bars in opposite directions.

9. A cutter as claimed in claim 8 in which said transmission means includes a shaft driven by said prime mover and provided with crank pins arranged at 180 degrees relatively to one another, lugs arranged on the knife bars, and a pitman connecting said lugs to said crank pins.

In testimony whereof I affix my signature at Peoria, Illinois, U. S. A., this 29th day of March, 1922.

PHILIP ALEXANDER CAMPBELL.